(12) United States Patent
Wang et al.

(10) Patent No.: US 11,206,555 B2
(45) Date of Patent: Dec. 21, 2021

(54) METHOD FOR IMPLEMENTING ANTENNA AZIMUTH CORRECTION BASED ON USER DATA

(71) Applicant: NANJING HOWSO TECHNOLOGY CO., LTD, Jiangsu (CN)

(72) Inventors: Jibin Wang, Nanjing (CN); Gemiao Zhu, Nanjing (CN); Xingxiu Yan, Nanjing (CN)

(73) Assignee: Nanjing Howso Technology Co., Ltd., Jiangsu (CN)

( * ) Notice: Subject to any disclaimer, the term of this patent is extended or adjusted under 35 U.S.C. 154(b) by 36 days.

(21) Appl. No.: 16/960,686

(22) PCT Filed: Feb. 14, 2019

(86) PCT No.: PCT/CN2019/075043
§ 371 (c)(1),
(2) Date: Jul. 8, 2020

(87) PCT Pub. No.: WO2020/107712
PCT Pub. Date: Jun. 4, 2020

(65) Prior Publication Data
US 2020/0351678 A1 Nov. 5, 2020

(30) Foreign Application Priority Data

Nov. 27, 2018 (CN) .......................... 201811420967.X

(51) Int. Cl.
*H04L 12/24* (2006.01)
*H04W 16/18* (2009.01)
(Continued)

(52) U.S. Cl.
CPC .......... *H04W 24/02* (2013.01); *H04L 41/142* (2013.01); *H04L 41/145* (2013.01);
(Continued)

(58) Field of Classification Search
CPC ....... G06N 7/005–08; G06N 20/10–20; H04B 17/0082–3913; H04L 41/14–26;
(Continued)

(56) References Cited

FOREIGN PATENT DOCUMENTS

| CN | 106844757 A | 6/2017 |
|----|-------------|--------|
| CN | 106921989 A | 7/2017 |

(Continued)

OTHER PUBLICATIONS

International Search Report and Written Opinion of the International Searching Authority (in English & Chinese) issued in PCT/CN2019/075043, dated Jun. 3, 2019; ISA/CN.

(Continued)

*Primary Examiner* — Timothy J Weidner
(74) *Attorney, Agent, or Firm* — Harness, Dickey & Pierce, P.L.C.

(57) ABSTRACT

Disclosed is a method for implementing antenna azimuth correction based on user data. Five prediction algorithms are combined to avoid some defects of an individual algorithm. By means of a method for applying a plurality of prediction model weights, a plurality of algorithms is organically combined, a high weight is applied to an algorithm having a good prediction effect, and a low weight is applied to an relatively bad algorithm, such that not only the accuracy of data prediction but also the stability of data prediction for different regions are ensured. By drawing a grid-level user data RSRP heat map for analyzed data to obtain sampling point information around a cell and a predicted azimuth, the present invention can find out, by means of deeper analysis, problems in engineering parameters, such as a longitude/latitude error, an azimuth error, and a reversely connected cell.

8 Claims, 5 Drawing Sheets

(51) Int. Cl.
*H04W 16/22* (2009.01)
*H04W 24/02* (2009.01)
*H04W 24/06* (2009.01)
*H04W 24/08* (2009.01)
*H04W 24/10* (2009.01)
*H04W 88/18* (2009.01)

(52) U.S. Cl.
CPC ............ *H04L 41/147* (2013.01); *H04L 41/16* (2013.01); *H04W 16/18* (2013.01); *H04W 16/22* (2013.01); *H04W 24/06* (2013.01); *H04W 24/08* (2013.01); *H04W 24/10* (2013.01); *H04W 88/18* (2013.01)

(58) Field of Classification Search
CPC ...... H04L 43/02–50; H04W 16/02–32; H04W 24/02–10; H04W 88/18–188
See application file for complete search history.

(56) References Cited

FOREIGN PATENT DOCUMENTS

| | | | |
|---|---|---|---|
| CN | 108124268 | A | 6/2018 |
| CN | 108306699 | A | 7/2018 |
| CN | 108375363 | A | 8/2018 |
| CN | 109151866 | A | 1/2019 |

OTHER PUBLICATIONS

3GPP, "3GPP TR 36.814 V9.2.0", Technical Specification Group Radio Access Network; Evolved Universal Terrestrial Radio Access (E-UTRA); Further advancements for E-UTRA physical layer aspects(Release 9), Mar. 30, 2017 (Mar. 30, 2017), section A.2.1.6.

(a)

(b)

METHOD FOR IMPLEMENTING ANTENNA AZIMUTH CORRECTION BASED ON USER DATA

CROSS-REFERENCE TO RELATED APPLICATIONS

This application is the national phase of International Application No. PCT/CN2019/075043, titled "METHOD FOR IMPLEMENTING ANTENNA AZIMUTH CORRECTION BASED ON USER DATA", filed on Feb. 12, 2019, which claims priority to Chinese Patent Application No. 201811420967.X, titled "METHOD FOR RECTIFYING ANTENNA AZIMUTH BASED ON USER DATA" filed on Nov. 27, 2018 with the Chinese Patent Office, which is incorporated herein by reference in its entirety.

FIELD

The present disclosure generally relates to the field of network technology, and in particular to a method for rectifying an antenna azimuth based on user data.

BACKGROUND

In the era of big data, mobile communication data is required to be acquired in a comprehensive and minute manner, which replaces a random and casual manner for acquiring traditional data, such as a conventional drive test. Since the acquired mobile communication data is accurate, accuracy of an analysis result can be ensured.

Every day a lot of data is generated in mobile communication. A steady and accurate model is necessary for exploiting a relationship among the data with such amount and such complexity, for predicting other related variables. Thus, there is a high requirement on an algorithm, and it is necessary to analyze a conventional modeling process to acquire a model with such accuracy. Characteristics of data are first analyzed with the aid of statistics and a visualization method, and then the data is modeled and analyzed. Model selection may be improper in a case that only a single model is considered. In practice, different data are generated due to a difference between areas. The model selection may be improper in a case that the data is inadequate or is not accumulated to a certain extent. It is likely that there is no chance to select another model once a model is selected, and an effect of prediction goes poor in case of the data being changed. Therefore, comprehensive information should be considered, to establish an effective algorithm for prediction based on the data.

In mobile communication, an effective monitoring and a means of identifying problems are usually absent in operation of an antenna feeder system. Thereby, a most outstanding problem in optimization concerns accuracy and reasonability of operation parameters. An error in an antenna operation parameter may be caused by following factors. Personnel who perform optimization does not submit updated operation parameters according to rules after adjusting a base station, or does not measure strictly or update accurately due to intense tasks. A routine task of thoroughly surveying operation parameters of antenna feed systems is not strictly performed, and only a small proportion of cells is accurately measured and surveyed in practice. Various antenna feeder devices and complex feeders, which are from multiple operators, are located in an antenna platform, and thereby the personnel who perform optimization cannot find a certain antenna or searches a wrong cell. Since a compass is widely applied in measurement, there is an error in the measurement due to an electromagnetic environment being complex around the platform and the antenna being measured at a distance.

Conventionally, operators depend on surveying base stations to acquire data such as an azimuth for a cell. Such methods wastes time, labor, and efforts, and a cost of operation and maintenance is high.

SUMMARY

In order to address the above issue, a processing technology of applying big data is provided according to embodiments of the present disclosure. The technology is based on a capability of mobile communication network of collecting, storing and analyzing data, and applies a machine learning algorithm. Multiple data sources are synthetically analyzed to evaluate a network comprehensively, thereby cleaning operation parameters of antennas. An abnormality in coverage of an antenna can be fast identified, quality of an antenna platform of a cell can be improved, and a strong support can be provided for engineering construction, network maintenance, and wireless optimization of the cell. Network quality is improved, and a strong technical support is provided for updating operation parameters directly in a platform for intelligent operation and maintenance of a network.

A method for rectifying an antenna azimuth based on user data is provide, including:

step 1, collecting data, where user data and operation-parameter data are collected as samples;

step 2, processing the data, including: deleting a cell of which longitude and latitude are empty in a operation-parameter table; selecting only a cell of which a coverage type is outdoors; matching the user data and the operation-parameter data through a cell identifier, in a granularity of multiple days and a level of a grid; deduplicating data groups obtained through the matching; counting an amount of the user data corresponding to each cell; retaining only a cell of which the amount of user data is greater than a preset amount; calculating a distance to the cell, for the user data; performing outlier detection to delete the user data with the distance that is long; and calculating an angle with respect to due north, of a direction to the cell, for the user data after the outlier detection;

step 3, calculating predicted azimuths of each cell through a prediction method based on intensity of sampling points, a prediction method based on density of sampling points and separate sectors, a prediction method based on a combination of intensity and density of sampling points, a prediction method based on intensity of sampling points and statistics on separate layers, and a prediction method based on intensity of sampling points and separate sectors, respectively;

step 4, predicting on a training set through the five prediction methods in the step 3, and obtaining weights for the five prediction methods by training through a Monte Carlo method based on a result of the predicting, where the training set is user data and operation-parameter data of base-station survey that are measured in practice; and step 5, selecting optimum weights, according to an effect of predicting on the training set by using the weights obtained in the step 4, and determining a prediction model configured with the optimum weights, where the prediction model is configured to predict an azimuth based on user data and output the azimuth that is predicted, and the azimuth that is predicted is configured to rectify an azimuth of an antenna.

Generally, an error between a predicted value and a true value is large in case of a large amount of data. According to the present disclosure, a joint algorithm formed by five basic prediction algorithms in conjunction with a weight algorithm is adopted to predict data, in order to avoid an excessive error. Accuracy of predicted data can be ensured.

The data groups include: time, an international mobile subscriber identification number, the cell identifier used by a user, longitude of the user, latitude of the user, reference signal received power, the cell identifier of the cell, longitude of the cell, latitude of the cell, an azimuth, a name of the cell, and a coverage type of the cell.

In a specific embodiment, the prediction method based on intensity of sampling points includes: determining, for each cell identifier, an average of the angles for n sampling points as the predicted azimuth, where reference signal received power (RSRP) of the n sampling points are top n largest among all sampling points under said cell identifier, and n is a natural number.

The prediction method based on intensity of sampling points and statistics on separate layers includes: deduplicating the distances, calculating n−1 percentiles of the deduplicated distances, and arranging the n−1 percentiles in an ascending order, for each cell identifier; categorizing the user data into m layers according to the distances to the cell, where m≥3, a range of a first layer is the distance being smaller than or equal to the first of the percentiles, a range of a second layer is the distance being larger than the first one of the percentiles and smaller than or equal to the second of the percentiles, a range of a third layer is the distance being larger than the second one of the percentiles and smaller than or equal to the third of the percentiles, a range of a fourth layer is the distance being larger than the third of percentiles and smaller than or equal to the fourth of the percentiles, and a range of a n-th layer is the distance being larger than the (n−1)th of percentiles and smaller than or equal to the n-th of the percentiles; deleting data of the first layer and the last layer, to retain data of intermediate loops; determining, for each intermediate loop, an average of the angles for n sampling points, where reference signal received power (RSRP) of the n sampling points are top n largest among all sampling points in said intermediate loop, and n is a natural number; and determining an average of the averages of the angles for the n sampling points, as the predicted azimuth.

The prediction method based on a combination of intensity and density of sampling points includes: dividing, for each cell identifier, sampling points into 360/N sectors based on the angle of the direction to the cell, each of which occupies N degrees, N∈[1, 360], and 360/N is an integer; counting a total quantity of the sampling points under each cell identifier; selecting, among the 360/N sectors, a sector in which a quantity of the sampling points is greater than d % of the total quantity, d∈[1, 99]; calculating, for the selected sector, an average of RSRP of n sampling points, where RSRP of the n sampling points are top n largest among all sampling points in the selected sector, and n is a natural number; selecting t sector, where the average of RSRP of the t sectors are top t largest among all the selected sector, and t is an integer between 1 and 360/N; and calculating an average of azimuths of the t sectors as the predicted azimuth.

The prediction method based on intensity of sampling points and separate sectors includes: dividing, for each cell identifier, sampling points into 360/N sectors based on the angle of the direction to the cell, each of which occupies N degrees; calculating, for each sector, an average of RSRP of n sampling points, where RSRP of the n sampling points are top n largest among all sampling points in said sector; and determining an azimuth of a sector of which the average of RSRP is largest among all sectors, as the predicted azimuth.

The prediction method based on density of sampling points and separate sectors includes: dividing, for each cell identifier, sampling points into 360/N sectors based on the angle of the direction to the cell, each of which occupies N degrees; counting a quantity of sampling points in each sector; and selecting an azimuth of a sector of which the quantity of sampling points is largest among all sectors, as the predicted azimuth.

The Monte Carlo algorithm includes: selecting, for P times, a part of data randomly from the training set to acquire P training samples; generating Q combinations of weights randomly for each of the P training samples, where Q is a natural number; calculating, for each of the Q combinations of weights, a proportion in all predicted azimuths outputted by a training model as a confidence of said combination of weights, where the proportion is a proportion of azimuths of which a difference from an azimuth in the base-station survey is within R°, and a range of R is [0, 360); and determining, for each training sample, the combination of weights with the largest confidence.

According to the present disclosure, five prediction algorithms are combined to avoid disadvantages of a single algorithm. Multiple algorithms are systematically combined by weighting each prediction model separately. A high weight is attributed to an algorithm with a good prediction effect, while a low weight is attributed to an algorithm with a poor prediction effect. Thereby, accuracy of data prediction and stability of data prediction for different regions are ensured. In addition, a thermodynamic chart of RSRP is obtained by rasterizing user data, and the azimuth predicted based on the user data through the prediction model is drawn in the thermodynamic chart. It is facilitated that the maintenance personnel searches based on the thermodynamic chart for problems in operation parameters, for example, an error in latitude and longitude, an azimuth error, and inverse installation in cells.

DETAILED DESCRIPTION OF EMBODIMENTS

To make a purpose, a technical solution and advantages of the present disclosure more clear and obvious, hereinafter the present disclosure is further illustrated in detail in conjunction with the drawings and embodiments. It should be understood that the embodiments described herein are only intended to explain the present disclosure, instead of limiting the present disclosure.

Predicted data is required to be accurate and stable in predicting an azimuth for a cell. Generally, a performance of an ordinary algorithm is poor in practice is due to limitation and applicability, such that the predicted data is poor. According to the present disclosure, multiple algorithms are combined to avoid disadvantages of a single algorithm. Multiple algorithms are organically combined with together by using a method of entrusting with weights. A high weight is attributed to an algorithm with a good prediction effect, while a low weight is attributed to an algorithm with a poor prediction effect. Thereby, accuracy of data prediction and stability of data prediction for different regions are ensured. Stability of prediction can also be ensured in case of selecting a different region. A joint algorithm is applied in practice according to the present disclosure, achieving a desired effect. Good results are achieved in both stability and accuracy.

Figure 1:
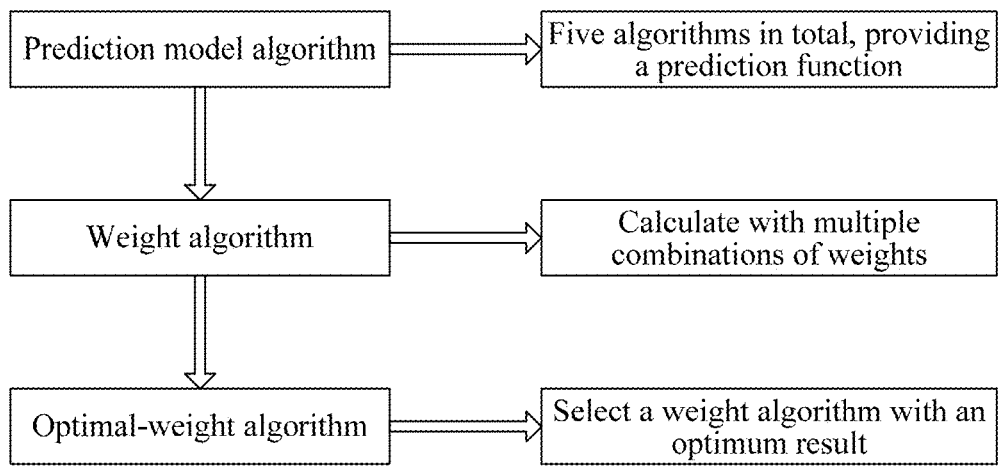
FIG. 1 is a flowchart of cleaning antenna operation parameters through a method for rectifying an antenna azimuth based on user data according to the present disclosure.

As shown in FIG. 1, a model for cleaning antenna operation parameters includes a prediction model algorithm, a weight algorithm, and an optimal-weight algorithm.

The method for rectifying an antenna azimuth based on user data includes following steps (1), (2) and (3).

In step (1), data is collected. User data and operation-parameter data in 30 days are collected. Index variables that are mainly applied include: time (rpt_time), an international mobile identification number (imsi), a cell identifier used by a user (s_ci), longitude of the user (longitude), latitude of the user (latitude), reference signal received power (s_rsrp), a cell identifier of a cell, longitude of the cell (longitude), latitude of the cell (latitude), an azimuth (azimuth), a name of the cell (cell_name) and a coverage type of the cell (cover_type).

In step (2), the data is processed. Firstly, a cell of which longitude and latitude are empty in a operation-parameter table is deleted, and only a cell of which a coverage type is outdoors is selected. Various source data indicated in the above step (1) are matched through the cell identifier in a grid level and in a granularity of 30 days. Then, the matched data are deduplicated, and an amount of the user data corresponding to each cell is counted. Only the cell of which the amount of user data is greater than a 300 pieces is retained. A distance to the cell is calculated for the user data, based on longitude and latitude of the cell and longitude and latitude in the user data. Further, outlier detection is performed to delete the user data that has a long distance. Afterwards, an angle of a direction to the cell, with respect to due north, is calculated for the user data, and statistics are carried on the angles.

In step (3), analysis is performed based on algorithms, where five prediction algorithms as follows.

A first algorithm (a prediction method based on intensity of sampling points) is as follows. For each ci, an average of the angles for 10 sampling points is determined as a predicted azimuth of the first algorithm. Feference signal received power (RSRP) of the 10 sampling points are top 10 largest among all sampling points under said ci.

A second algorithm (a prediction method based on intensity of sampling points and statistics on separate layers) is as follows. For each ci, the distances are deduplicated, and then 4 percentiles of 20%, 40%, 60% and 80% are calculated for the distances. The distances to the cell are categorized into 5 layers based on the OTT sampling points. The distance smaller than or equal to the percentile of 20% is categorized into a first layer. The distance greater than the percentile of 20% and smaller than or equal to the percentile of 40% is categorized into a second layer. The distance greater than the percentile of 40% and smaller than or equal to the percentile of 60% is categorized into a third layer. The distance greater than the percentile of 60% and smaller than or equal to the percentile of 80% is categorized into a fourth layer. The distance greater than the percentile of 80% is categorized into a fifth layer. Data of the first layer and the fifth layer are deleted, and data of the second layer, the third layer and the fourth layer are retained. An average of the angles for 5 sampling points are calculated in each of the second layer, the third layer and the fourth layer, and RSRP of the 5 sampling points are top 5 largest among all sampling points in the respective layer. Finally, an average of the averages of the angles of the 5 sampling points in the second layer, the third layer and the fourth layer is calculated as a predicted azimuth of the second algorithm.

A third algorithm (a prediction method based on a combination of intensity and density of sampling points) is as follows. For each ci, sampling points are divided into 72 sectors based on the angles of the direction to the cell (that is, each sector occupies a range of 5 degrees). A total quantity of sampling points under each ci is counted. A sector in which a quantity of sampling points is greater than 4% of the total quantity is selected from the 72 sector domains. An average of RSRP of 5 sampling points is calculated in each selected sector, and RSRP of the 5 sampling points are top 5 largest among all sampling points in such selected sector. 2 sectors are determined from the selected sectors, and the averages of RSRP of the 2 sectors are top 2 largest among the selected sectors. An average of azimuths of the 2 sectors is calculated as a predicted azimuth of the third algorithm.

A fourth algorithm (a prediction method based on intensity of sampling points and separate sectors) is as follows. For each ci, sampling points are divided into 72 sectors based on the angles of the direction to the cell (that is, each sector occupies a range of 5 degrees). An average of RSRP of 10 sampling points is calculated for each sector, and the 10 sampling points are top 10 largest among all sampling points in such sector. Finally, an azimuth of a sector with the largest average of RSRP among all sectors is determined as a predicted azimuth of the fourth algorithm.

A fifth algorithm (a prediction method based on density of sampling points and separate sectors) is as follows. For each ci, sampling points are divided into 72 sectors based on the angles of the direction to the cell (that is, each sector occupies a range of 5 degrees). A quantity of sampling points in each sector is counted. An azimuth of a sector of which the quantity of sampling points is largest among all sectors is determined as a predicted azimuth of the fifth algorithm.

In a specific embodiment, steps of the weight algorithm include following steps (1) and (2).

In step (1), sampling-point data and operation-parameter data in actual base-station survey serves as a training set, and prediction is performed on the training set through the above five algorithms for a prediction model.

In step (2), weights for the five algorithms are obtained by training through a Monte Carlo method, based on a result of the prediction of the five algorithms. A method of obtaining the weights by training through the Monte Carlo algorithm is as follows. A half of data is randomly selected for training, from the training set. The selection is repeated for 50 times, namely, 50 training samples are obtained. 10000 combinations of weights are randomly generated for each training sample (1000, 3000, 5000, 7000, 9000, 10000, 11000, 13000, and 20000 weight combinations are generated, respectively, to check an influence of a quantity of iterations on a prediction result, and it is obtained that the result of the quantity of 10000 is best). A proportion of predicted azimuths, of which a difference from an azimuth in the base-station survey is within 20 degrees, in all predicted azimuths serves as a criterion for evaluating each combination. The proportion serves a confidence of the combination of weights. For each training sample, a combination of weights with the largest proportion is finally outputted, that is, a combination of weights with the largest confidence is finally outputted.

In a specific embodiment, the combination of weights with the largest confidence is determined for each training sample, according to following equations (1) and (2).

$$Z = L(angel_{predict}, angel_{true}) \quad (1)$$

$$\cos t = \frac{|\{Z > k \mid Z \in M\}|}{M} * 100\% \quad (2)$$

In the equation (1), Z represents an actual prediction error, $angle_{predict}$ represents a predicted azimuth, and $angle_{true}$ represents an azimuth in the base-station survey. In the equation (2), cost represents an error coefficient corresponding to a combination of weights, M represents a total quantity of cells in the base-station survey in a training sample, and K represents a determined threshold for an azimuth error.

It can be seen that the confidence of the combination of weights is 1-cost, based on the above equations. For example, cost is 20%, and the confidence of the combination of weights is 1-20%, namely, 80%.

In a specific embodiment, the optimal-weight algorithm includes following steps (1) and (2).

In step (1), an average or a median of the outputted 50 optimum combinations of weights is calculated to obtain final combinations of weights. Prediction is performed on validation set by using the average and the median, respectively, of the 50 combinations of weights, and the corresponding combination of weights with a better prediction result is selected. An example of combination of weights for the five algorithms is: W_algorithm1=0.02383308, W_algorithm2=0.48847700, W_algorithm3=0.08321591, W_algorithm4=0.08895580 and W_algorithm5=0.27992355.

In step (2), prediction results of aforementioned five algorithms are weighted to obtain a final predicted azimuth.

In order to evaluate a prediction effect of the joint algorithm, OTT data and base-station survey data of 691 cells in Fujian province are selected for a test. Accordingly, accuracy and stability of prediction results based on the five prediction algorithms are obtained.

Steps of the test are as follows.

First, data is collected and processed. Data prediction is performed through the five prediction algorithms and the joint algorithm to obtain data prediction results, respectively.

Then, results of the five prediction algorithms and the joint algorithm are compared with actual data in base-station survey data. Accuracy of the joint algorithm is compared with accuracy of the five prediction algorithms, so as to evaluate an effect of a model of the joint algorithm comprehensively.

The test includes two parts. In a first part, training data is inputted into models of the five prediction algorithms for training and prediction, to obtain error data. Then, the training data is inputted into the joint algorithm for training and prediction, to obtain error data.

In a second part, errors from a training set and a validation set are compared between the joint algorithm and the five prediction algorithms, to evaluate an effect of the joint algorithm.

Experiment Data

Data is first collected and processed. OTT (over the top) data of 691 cells in 30 days is collected. The OTT data refers to data collected through an OTT service of communications business. There are thousands to tens of thousands of pieces of data in each cell. Base stations of the 691 cells are surveyed to acquire data of actual information of the cells.

It is necessary to perform an outlier processing on the data, to ensure integrality of the data. The data without the cell identifier and latitude and longitude information removed. Duplication and the data with an abnormal distance are removed from sampling points.

Experiment Method

Firstly, the training data is inputted into a model for training and a prediction, and predicted data and error data obtained by each algorithm are stored. Then, the training data is inputted into the joint algorithm for training and prediction, and obtained predicted data and error data are stored. Finally, prediction effects are compared between the joint algorithm and the five prediction algorithms. Errors for the training set and a validation set are calculated for the joint algorithm and the five algorithms, respectively. A proportion of predicted azimuths with an error within 20 degrees (inclusive) is calculated.

Experiment Result

Figure 2:
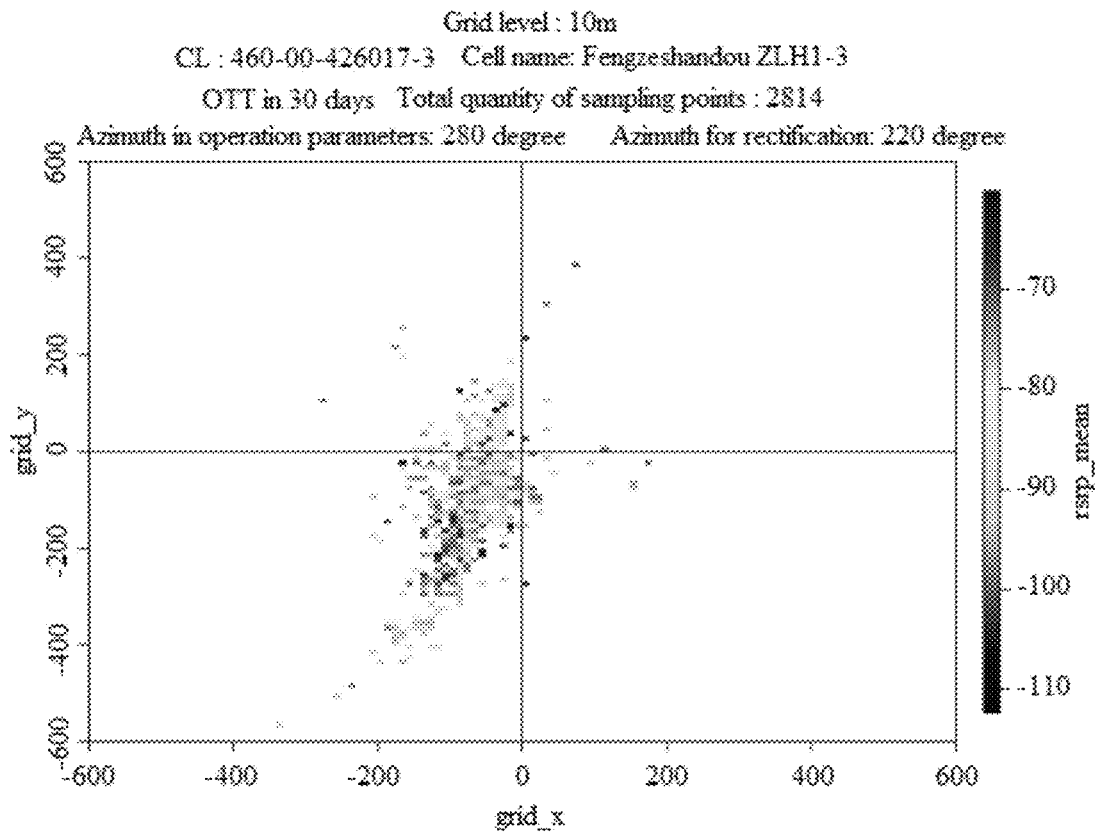
FIG. 2 is a thermodynamic chart of RSRP of OTT sampling points in a 10-meter grid level, for a cell in a city according to an embodiment as shown FIG. 1.
Figure 3:
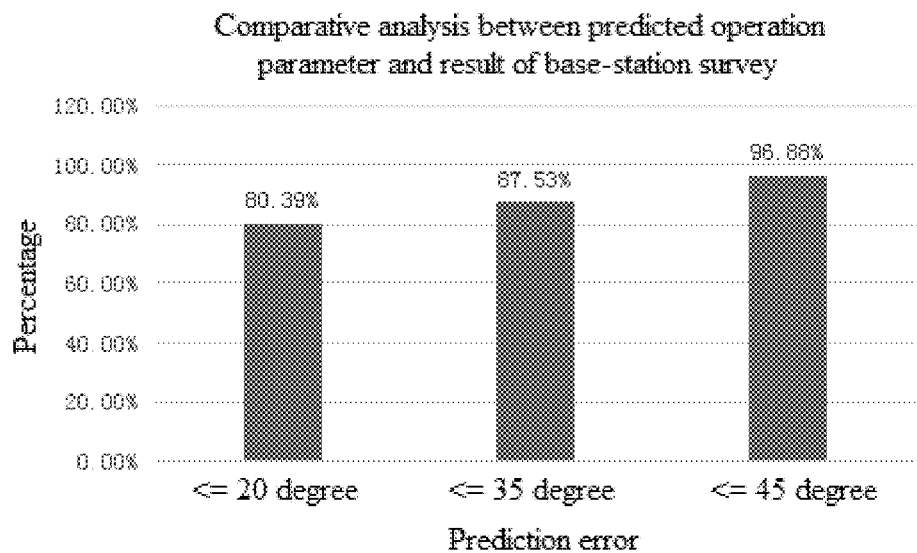
FIG. 3 is a result of a comparative analysis between predicted operation parameters and a result of base-station survey in a province, according to an embodiment as shown in FIG. 1.
Figure 4:
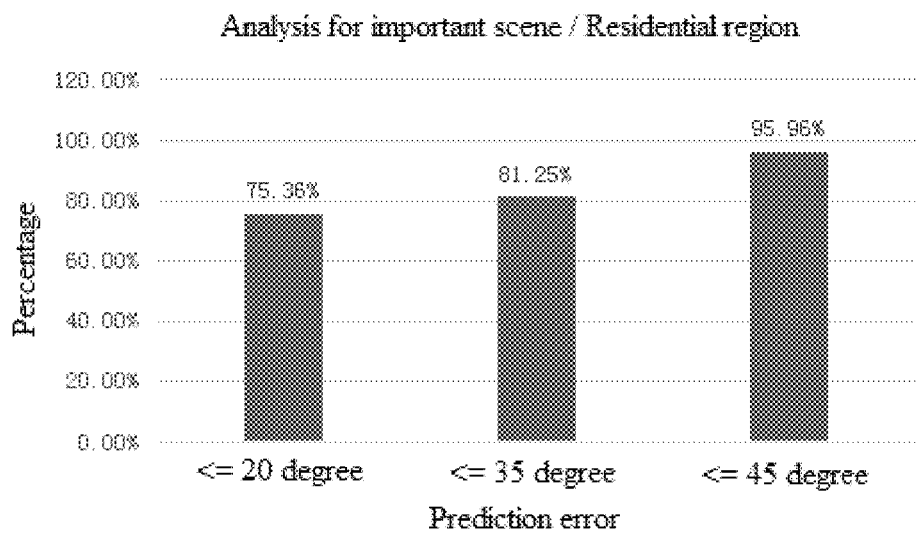
FIG. 4 is a result of a comparative analysis between predicted operation parameters and a result of base-station survey, in an important scene or a residential area, according to an embodiment as shown in FIG. 1.
Figure 5:
FIG. 5 is a diagram of a practical effect of identifying an error in latitude and longitude, according to an embodiment as shown in FIG. 1.
Figure 6:
FIG. 6 is a diagram of a practical effect of identifying an azimuth error, according to an embodiment as shown in FIG. 1.
Figure 7:
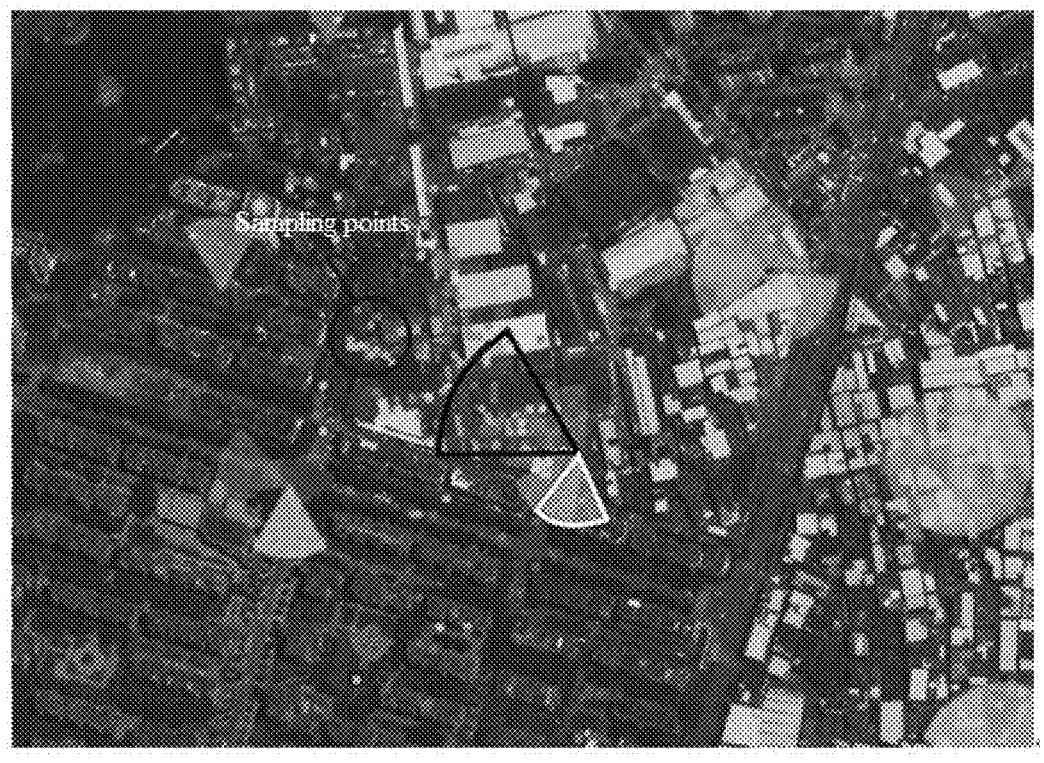
FIG. 7 is a diagram of a practical effect of identifying inverse installation in cells, according to an embodiment as shown in FIG. 1.
Figure 7:
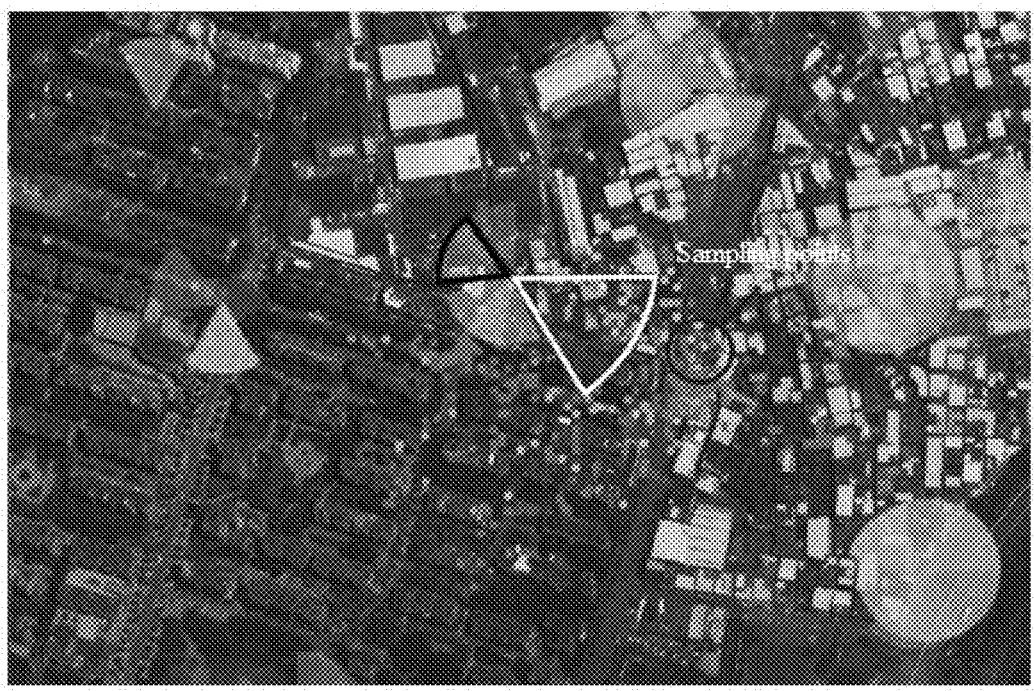

Prediction accuracy of the joint algorithm is higher, from the comparison between the joint algorithm and the five algorithms. Some relevant diagrams are illustrated for the prediction based on the joint algorithm. FIG. 2 is a thermodynamic chart of RSRP of OTT sampling points in 10-meter grid level, of a cell in Quanzhou city according to an embodiment. An identifier of the cell, a name of the cell, sampling points in 30 days, an azimuth in operation parameters, a predicted azimuth, and amplitude of RSRP at each sampling point can be read from FIG. 2. FIG. 3 is a result of a comparative analysis between operation-parameter prediction and a result of base-station survey, in a province according to an embodiment. It can be seen from FIG. 3 that a proportion of the cells with a prediction error within 45 degree reaches 96.88%. Such large proportion indicates a good accuracy of the prediction model. FIG. 4 shows a result of a comparative analysis between operation-parameter prediction and a result of base-station survey in a residential region. It shows that accuracy is more than 90%. Shown in the Figure are proportions of the cells with a prediction error within 20 degree, 35 degree, and 45 degree, respectively. Such three large proportions indicate a good accuracy of the prediction model. A same effect can be achieved in other scenarios such as a road or a city village. FIG. 5 is an actual effect on erroneous latitude and longitude according to an embodiment. Survey personnel conduct an on-site survey on operation parameters of a base station. The base station is not found in at a position indicated by the longitude and latitude in original operation parameter, which is consistent with a conclusion that longitude and latitude in an original system are erroneous. The survey personnel analyze data based on OTT sampling points, and founded the base station at another location, which verifies that the present system can identify and determine longitude and latitude. FIG. 6 shows an actual effect on an azimuth error according to an embodiment. A predicted azimuth based on OTT sampling points of a cell is 75 degree, an actual azimuth in the survey is 60 degree, and an azimuth in the operation-parameter table is 20 degree. A difference between the predicted azimuth and the actual azimuth in the survey is smaller. In verification, it is suspected that the azimuth of the cell is incorrectly recorded by personnel. Hence, the present platform software can identify an abnormal azimuth fast. FIG. 7 shows an actual effect on antennas inversely installed in two cells. Shown in FIGS. 7 (*a*) and 7 (*b*) are two adjacent cells, respectively, which are marked by a black bold line and a white bold line. Small black, gray and white dots surrounding the cell represent sampling points. Reference is made to FIG. 7 (*a*), where an azimuth predicted for a first cell (the sector domain marked in the black bold line) based on data of sampling points through the aforementioned prediction model according to the present disclosure is 300 degree, while an actual azimuth for the first cell is 187 degree in the survey. Reference is made to FIG. 7 (*b*), where an azimuth predicted for a second cell (the sector domain marked in the white bold line) based on data of sampling points through the aforementioned prediction model according to the present disclosure is 120 degree, while an actual azimuth for the second cell is 293 degree in the survey. It can be seen that an error in prediction for the two adjacent cells are very large, and thereby the data is provided to maintenance personnel for reference. The maintenance personnel in an on-site check find that antennas in the two cells are suspected to be inversely installed. Thereby, the present platform software can identify inverse installation of antennas in cells fast.

A technical solution disclosed according to the present disclosure in not limited to technical solutions disclosed according to the aforementioned embodiments, and also includes a technical solution including any combination of above technical features.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The embodiments of the present disclosure are described in a progressive manner, and each embodiment places emphasis on the difference from other embodiments. Therefore, one embodiment can refer to other embodiments for the same or similar parts. Since apparatuses, systems, intelligent devices, and the storage media disclosed in the embodiments corresponds to the methods disclosed in the embodiments, the description of apparatuses, systems, intelligent devices, and the storage media is simple, and reference may be made to the relevant part of the methods.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of the present disclosure.

The steps of the method or algorithm described according to the embodiments disclosed herein can be implemented in forms of hardware, a software module executed by a processor or the combination of the both. The software module may be stored in a Random Access Memory (RAM), a memory, a Read-Only Memory (ROM), an electrically programmable ROM, an electrically erasable programmable ROM, a register, a hardware disk, a movable magnetic disk, CD-ROM or any other forms of storage medium well known in the art.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A method for rectifying an antenna azimuth based on user data, comprising:

step 1, collecting user data and an operation-parameter table, wherein the operation-parameter table comprises operation-parameter data of a cell;

step 2, comprising:

deleting a parameter of a cell, of which longitude and latitude are empty, from a operation-parameter table;

selecting an operation-parameter data of a cell, of which a coverage type is outdoors, from the operation-parameter table;

rasterizing the user data, to filter the user data;

matching the filtered user data and the selected operation-parameter data through a cell identifier, to obtained matched data groups, wherein each data group comprises the operation-parameter data of the cell and the user data matching the operation-parameter data of the cell;

deduplicating the user data for the data groups;

counting an amount of the user data corresponding to each cell;

selecting a cell of which an amount of the user data is greater than a first preset value, as a target cell;

calculating a distance from a user to the target cell, based on latitude and longitude of the target cell and latitude and longitude of the user, wherein the latitude and longitude of the user are in the user data matching the target cell;

selecting the user data with the distance smaller than a second preset value, as target user data; and calculating an angle with respect to due north, of a line between the user and the target cell, based on the target user data;

step 3, calculating, based on the angle and the distance, predicted azimuths of each cell through a prediction algorithm based on intensity of sampling points, a prediction algorithm based on density of sampling points and separate sectors, a prediction algorithm based on a combination of intensity and density of sampling points, a prediction algorithm based on intensity of sampling points and statistics on separate layers, and a prediction algorithm based on intensity of sampling points and separate sectors, respectively;

step 4, training a prediction model comprising the five prediction algorithms in the step 3 through a Monte Carlo algorithm, to obtain weights for the five prediction algorithms, wherein the target user data and an azimuth in base-station survey serve as a training set;

step 5, comprising:
selecting optimum weights, according to a prediction effect of the weights obtained in the step 4 on a validation set; and determining a prediction model configured with the optimum weights, wherein the prediction model is configured to predict an azimuth based on the user data and output the azimuth that is predicted, and the azimuth that is predicted is configured to rectify an azimuth of an antenna.

2. The method according to claim 1, wherein the data groups comprises: time, an international mobile subscriber identification number, the cell identifier used by a user, longitude of the user, latitude of the user, reference signal received power, the cell identifier of the cell, longitude of the cell, latitude of the cell, an azimuth, a name of the cell, and a coverage type of the cell.

3. The method according to claim 1, wherein the prediction algorithm based on intensity of sampling points is configured to:
determine, for each cell identifier, an average of the angles for n sampling points as the predicted azimuth, where reference signal received power (RSRP) of the n sampling points are top n largest among all sampling points under said cell identifier, and n is a natural number.

4. The method according to claim 1, wherein the prediction algorithm based on intensity of sampling points and statistics on separate layers is configured to:
for sampling points corresponding to each cell identifier,
deduplicate the distances;
calculate m−1 percentiles of the deduplicated distances;
arrange the m−1 percentiles in an ascending order;
categorize the user data into m layers according to the distances to the target cell, wherein m≥3, a range of a first layer is the distance being smaller than or equal to the first of the percentiles, a range of a i-th layer is the distance being larger than the (i−1)th one of the percentiles and smaller than or equal to the i-th one of the percentiles, and a range of a m-th layer is the distance being larger than the (m−1)th of percentiles, where i is an integer greater than 1 and smaller than an integer m;
delete data of the first layer and the last layer, to retain data of intermediate loops;
determine, for each intermediate loop, an average of the angles for n sampling points, wherein reference signal received power (RSRP) of the n sampling points are top n largest among all sampling points in said intermediate loop, and n is a natural number; and determine an average of the averages of the angles for the n sampling points, as the predicted azimuth.

5. The method according to claim 1, wherein the prediction algorithm based on a combination of intensity and density of sampling points is configured to:
for sampling points corresponding to each cell identifier,
divide the sampling points into 360/N sectors, based on the angles of the lines between the sampling points and the target cell, wherein each of the 360/N sector occupies N degrees, N∈[360], and 360/N is an integer;
count a total quantity of the sampling points under each cell identifier;
select, among the 360/N sectors, a sector in which a quantity of the sampling points is greater than d % of the total quantity, d∈[1,99];
calculate, for the selected sector, an average of reference signal received power (RSRP) of n sampling points, wherein RSRP of the n sampling points are top n largest among all sampling points in the selected sector, and n is a natural number;
select t sector, wherein the averages of RSRP of the t sectors are top t largest among all the selected sector, and t is an integer ranging from 1 to 360/N; and
calculate an average of azimuths of the t sectors as the predicted azimuth.

6. The method according to claim 1, wherein the prediction algorithm based on intensity of sampling points and separate sectors is configured to:
for sampling points corresponding to each cell identifier,
divide the sampling points into 360/N sectors, based on the angles of the lines between the sampling points and the target cell, wherein each of the 360/N sectors occupies N degrees;
calculate, for each of the 360/N sectors, an average of reference signal received power (RSRP) of n sampling points, wherein RSRP of the n sampling points are top n largest among all sampling points in said sector; and
determine an azimuth of a sector, of which the average of RSRP is largest among all sectors, as the predicted azimuth.

7. The method according to claim 1, wherein the prediction algorithm density of sampling points and separate sectors is configure to:
divide the sampling points into 360/N sectors, based on the angles of the lines between the sampling points and the target cell, wherein each of the 360/N sectors occupies N degrees;
count a quantity of sampling points in each sector; and
selecting an azimuth of a sector, of which the quantity of sampling points is largest among all sectors, as the predicted azimuth.

8. The method according to claim 1, wherein the Monte Carlo algorithm is specifically configured to:
select, for P times, a part of data randomly from the training set, to acquire P training samples;
generate Q combinations of weights randomly for each of the P training samples, wherein Q is a natural number;
calculate, for each of the Q combinations of weights, a proportion in all predicted azimuths outputted by the prediction model with said combination of weights as a confidence of said combination of weights, wherein the proportion is a proportion of azimuths of which a difference from the azimuth in base-station survey is within $R^o$, and a range of R is [0, 360); and determine, for each training sample, the combination of weights with the largest confidence.

\* \* \* \* \*